United States Patent
Shorter, Jr. et al.

(10) Patent No.: US 11,004,346 B2
(45) Date of Patent: May 11, 2021

(54) COMPREHENSIVE FLIGHT PLANNING TOOL

(71) Applicant: Aircraft Owners and Pilots Association, Frederick, MD (US)

(72) Inventors: Douglas Nolen Shorter, Jr., Leesburg, VA (US); John Dennis Hamilton, Frederick, MD (US); Kimberly Lynn Ocasek, Summerville, SC (US); Eric John Rush, Carlisle, PA (US); Brian Michael Tenberg, Manchester, MD (US); John Vance Whitehouse, Walkersville, MD (US); Sergey Krilov, Frederick, MD (US)

(73) Assignee: AIRCRAFT OWNERS AND PILOTS ASSOCIATION, Frederick, MD (US)

( * ) Notice: Subject to any disclaimer, the term of this patent is extended or adjusted under 35 U.S.C. 154(b) by 0 days.

(21) Appl. No.: 16/845,273

(22) Filed: Apr. 10, 2020

(65) Prior Publication Data
US 2020/0258398 A1 Aug. 13, 2020

Related U.S. Application Data

(63) Continuation of application No. 15/796,250, filed on Oct. 27, 2017, now Pat. No. 10,657,826, which is a
(Continued)

(51) Int. Cl.
*G08G 5/00* (2006.01)
*G06Q 10/10* (2012.01)
(Continued)

(52) U.S. Cl.
CPC ............ *G08G 5/0034* (2013.01); *G06F 3/00* (2013.01); *G06F 3/048* (2013.01); *G06F 9/451* (2018.02);
(Continued)

(58) Field of Classification Search
None
See application file for complete search history.

(56) References Cited

U.S. PATENT DOCUMENTS 5,566,073 A  10/1996  Margolin
5,874,905 A   2/1999  Nanba et al.
(Continued)

FOREIGN PATENT DOCUMENTS

WO  WO 01/27822 A1  4/2001

OTHER PUBLICATIONS

David Crossley et al., A Generic Map Interface to Query Geographic Information Using the World Wide Web, http://www.w3.org/Conferences/WWW4/Papers/australia/#15, Apr. 10, 2001.

*Primary Examiner* — James M McPherson
(74) *Attorney, Agent, or Firm* — Finnegan, Henderson, Farabow, Garrett & Dunner, LLP

(57) ABSTRACT

A system for providing a flight planning tool may include a memory device and a weather module configured to receive weather data from a third-party device usable by a flight planning module to generate a flight plan. The system may also include a hardware processor configured to execute instructions to provide an API for facilitating communication with a client device or a third-party device; receive a request from the client device indicating a user input indicative of first information related to a flight; collect second information from a third-party device based on the first information; generate a weather message based on the user input and the information from the third-party device, wherein the weather message includes information associated with the flight; provide a user interface to the client device for communicating the weather message; and display graphics indicative of the flight information included in the weather message.

20 Claims, 4 Drawing Sheets

Related U.S. Application Data continuation of application No. 14/929,151, filed on Oct. 30, 2015, now Pat. No. 9,911,338.

(60) Provisional application No. 62/107,071, filed on Jan. 23, 2015, provisional application No. 62/137,327, filed on Mar. 24, 2015, provisional application No. 62/073,425, filed on Oct. 31, 2014.

(51) Int. Cl.
 *G06F 3/048* (2013.01)
 *G06F 3/00* (2006.01)
 *G06F 9/451* (2018.01)

(52) U.S. Cl.
 CPC ........... *G06Q 10/10* (2013.01); *G06Q 10/109* (2013.01); *G08G 5/0013* (2013.01); *G08G 5/0026* (2013.01); *G08G 5/0043* (2013.01); *G08G 5/0091* (2013.01)

(56) References Cited

U.S. PATENT DOCUMENTS

| | | |
|---|---|---|
| 5,944,769 A | 8/1999 | Musk et al. |
| 6,005,581 A | 12/1999 | Gjullin |
| 6,112,141 A | 8/2000 | Briffe et al. |
| 6,134,500 A | 10/2000 | Tang et al. |
| 6,240,341 B1 | 5/2001 | Snyder |
| 6,353,794 B1 | 5/2002 | Davis et al. |
| 6,388,688 B1 | 5/2002 | Schileru-Key |
| 6,459,986 B1 | 10/2002 | Boyce et al. |
| 6,675,092 B1 | 1/2004 | Katayama et al. |
| 7,263,494 B1 | 8/2007 | Harris |
| 7,555,725 B2 | 6/2009 | Abramson et al. |
| 7,623,494 B2 | 11/2009 | Zhu et al. |
| 7,640,098 B2 | 12/2009 | Stenbock et al. |
| 8,447,512 B2 | 5/2013 | Stenbock et al. |
| 9,511,877 B2 | 12/2016 | Masson |
| 9,810,770 B1 | 11/2017 | Weichbrod |
| 9,849,999 B1 | 12/2017 | Fymat |
| 2001/0027375 A1 | 10/2001 | Machida et al. |
| 2002/0059296 A1 | 5/2002 | Hayashi et al. |
| 2010/0152962 A1 | 6/2010 | Bennet |
| 2011/0264313 A1 | 10/2011 | Sampath |
| 2011/0313597 A1 | 12/2011 | Wilson et al. |
| 2012/0010765 A1 | 1/2012 | Wilson et al. |
| 2012/0221375 A1 | 8/2012 | Tillotson |
| 2012/0259669 A1 | 10/2012 | Stilwell et al. |
| 2013/0013133 A1 | 1/2013 | Walter |
| 2013/0265425 A1 | 10/2013 | Smailus |
| 2013/0267186 A1 | 10/2013 | Agarwal et al. |
| 2015/0169191 A1 | 6/2015 | Maji |
| 2015/0199906 A1 | 7/2015 | Judy |
| 2016/0111007 A1 | 4/2016 | Dennerline |
| 2016/0180715 A1 | 6/2016 | Burke et al. |

COMPREHENSIVE FLIGHT PLANNING TOOL

PRIORITY CLAIM

This application is a continuation of application Ser. No. 15/796,250, filed Oct. 27, 2017, which is a continuation of application Ser. No. 14/929,151, filed Oct. 30, 2015, which claims priority under 35 U.S.C. § 119 to U.S. Provisional Application No. 62/107,071, filed on Jan. 23, 2015, U.S. Provisional Application No. 62/137,327, filed on Mar. 24, 2015, and U.S. Provisional Application No. 62/073,425, filed on Oct. 31, 2014. All of the above applications are incorporated by reference.

TECHNICAL FIELD

The disclosed embodiments generally relate to flight planning, and more particularly, to providing a comprehensive flight planning tool for assisting general aviation pilots with planning aviation flights through the customized integration of information.

BACKGROUND

Modern flight planning has continued to evolve from early individual web-based applications that separately supplied a general aviation pilot with flight information, such as weather, aircraft performance information, airport directories, and fundamental route planning to more all-in-one-solutions. For example, mobile, in-cockpit Electronic Flight Bags (EFBs) provide some information relevant to a flight, such as real-time weather and traffic information via wireless access to remote devices. But while current systems like EFBs may provide mobile access to some available information, there is a need for a single, customized source for all critical and pertinent information necessary for a pilot to plan and execute a flight, as well as to integrate the information across other available platforms.

SUMMARY

In one aspect, the present disclosure is directed to a system for providing a flight planning tool. The system may include at least one memory device for storing flight information and one or more hardware processors. The one or more hardware processors may be configured to provide an Application Program Interface (API) for facilitating communication between the system and at least one of a client device and one or more third-party devices, receive, via the API, a request including first information related to a flight, collect, via the API and based on the first information, second information from one or more third-party devices, generate flight trip data based on the first and second information, wherein the flight trip data includes information and graphics associated with the flight, and provide, via the API, one or more user interfaces to the client device for communicating the flight trip data.

In another aspect, the present disclosure is directed to a method of providing a flight planning tool. The method may include generating an Application Program Interface (API) for facilitating communication between a flight planning system and at least one of a client device and one or more third-party devices, receiving, via the API, a request including first information related to an upcoming flight, collecting, via the API and based on the first information, second information from one or more third-party devices, generating flight trip data based on the first and second information, the flight trip data including information and graphics associated with the upcoming flight, and providing, via the API, one or more one or more user interfaces to the client device for communicating the flight trip data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments pertain to a comprehensive flight planning tool, which may take the form of an integrated suite of flight planning products. The flight planning tool may be a single-source online data fusion of all necessary resources for a general aviation pilot to accurately and competently plan a flight in a general aviation aircraft. Further, the flight planning tool may allow information to be easily integrated with third-party software.

Figure 1:
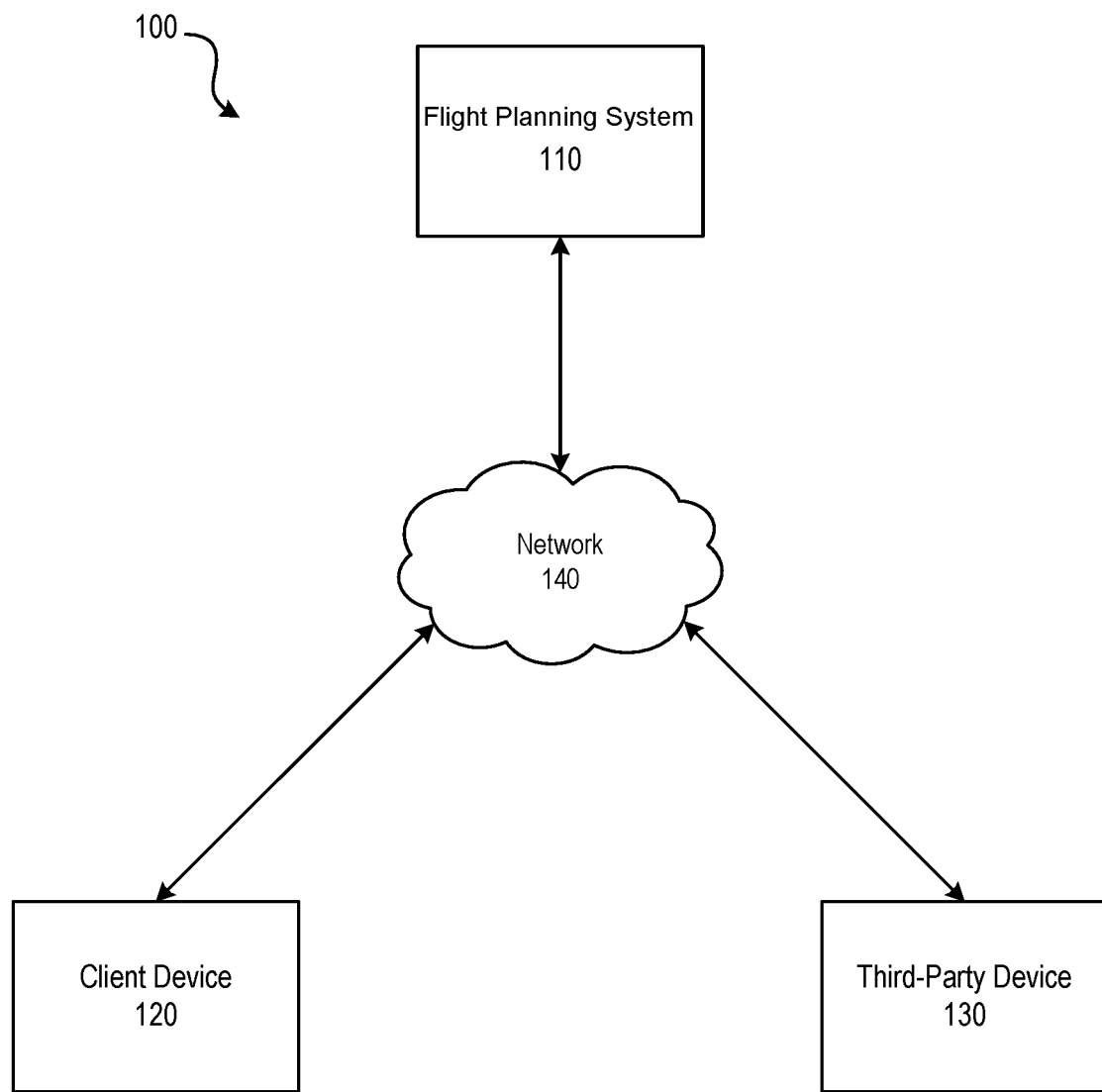
FIG. 1 is a block diagram of an exemplary system consistent with disclosed embodiments.

FIG. 1 is a diagram illustrating an exemplary system 100 for performing one or more operations consistent with the disclosed embodiments. In one embodiment, system 100 may include a flight planning system 110, a client device 120, a third-party device 130, and a network 140. The components and arrangement of the components included in the system 100 may vary. Thus, the system 100 may further include other components that perform or assist in the performance of one or more processes consistent with the disclosed embodiments.

Flight planning system 110 may include one or more computing systems that are configured to execute software instructions stored on one or more memory devices to perform one or more operations consistent with the disclosed embodiments. Flight planning system 110 may include one or more of a server, a computer, an embedded system, or a dedicated hardware device. In certain embodiments, flight planning system 110 may be configured as a particular apparatus, system, and the like based on the storage, execution, and/or implementation of the software instructions that perform one or more operations consistent with the disclosed embodiments.

In an exemplary embodiment, flight planning system 110 may include hardware and/or software components configured to create, store, and transmit a variety of flight planning tools. For example, flight planning system 110 may include hardware devices configured to gather information which may be useful to a pilot or individual associated with aviation. For instance, flight planning system 110 may include (or be configured to communicate with) devices that include weather data, airport data, aircraft data, pilot data, etc. Flight planning system 110 may collect this information and perform one or more processes to make it available to a user. For example, flight planning system 110 may be configured to provide the information to client device 120 and/or third party device 130.

Client device 120 may be one or more computing systems that are configured to execute software instructions for performing one or more operations consistent with the disclosed embodiments. In some embodiments, client device 120 may be one or more of a mobile device (e.g., a tablet, smartphone, laptop etc.), a desktop computer, a server, an embedded system, a dedicated hardware device, etc. Client device 120 may include one or more processors configured to execute software instructions stored in memory, such as memory included in client device 120. Client device 120 may include software that, when executed by a processor, performs known network-related communication and content display processes. For instance, client device 120 may execute browser software that generates and displays interface screens including content on interface hardware (e.g., a display device) included in, or connected to, client device 120.

In one embodiment, client device 120 may be a laptop or desktop computer configured to communicate with flight planning system 110 (e.g., via network 140). Client device 120 may be configured to execute software instructions to display an online flight planner generated by flight planning system 110. In one embodiment, the online flight planner may be a web-based application (e.g., website, applications, widget, etc.) through which client device 120 may provide information to a user (e.g., information collected by flight planning system 110) and request information from flight planning system 110 (e.g., generation of a flight plan).

In another embodiment, client device 120 may be a tablet or smartphone configured to store and/or execute one or more mobile applications ("apps"). For example, client device 120 may be configured to run a flight planning app, which may make flight planning system 110 accessible to a user (e.g., receive requests based on user input, display information received from flight planning device 10, etc.).

Third-party device 130 may be one or more computing systems associated with a third-party. Third-party device 130 may include one or more computing systems that are configured to execute software instructions for performing one or more operations consistent with the disclosed embodiments. For example, third-party device 130 may be as a server, computer, laptop, mobile device (e.g., tablet, smartphone, etc.), and embedded system, a dedicated hardware device, etc. While one third-party device 130 is shown in FIG. 1, it should be understood that system 100 may include a plurality of third-party devices 130, each associated with the same or different third-parties.

In one aspect, third-party device 130 may be associated with a third-party that determines, collects, and/or stores information related to aviation. For example, third-party device 130 may be associated with a weather forecaster, an aircraft manufacturer, an airport, an aircraft, an aviation regulatory entity (e.g., FAA and the like), etc., and generate periodic or real-time information, including pilot information, aircraft information, travel routes, custom waypoints, weather briefs, light plans, bulletins, and/or other information. In this way, flight planning system 110 may receive real-time information through communication with a selected third-party device 130.

Other information generated by third party device 130 may include real-time alerts and/or flight restrictions. For example, third party device 130 may generate weather alerts associated with particular regions, airports, or flight paths as weather patterns change. Third party device 130 may also generate alerts communicating critical flight information, such as temporary flight restrictions (TFR), notices to airmen (NOTAM), closed airport notices, etc. Such information may be official (published) notices from an authoritative entity (e.g., FAA) or non-official notices (e.g., stadium TFRs).

In one aspect, flight planning system 110 may be configured to generate NOTAMs based on flight planning information, including information received from one or more of the user, flight planning system 110, and third-party devices 130. For example, flight planning system 110 may be configured to generate NOTAMs based on a current location, future location (e.g., based on logged flight plans), calendar events, future flight plans, and/or other ascertainable parameters. Custom NOTAMs may be generated based on user preferences that may be stored in connection with system 100 (e.g., in a user database). For example, user preferences may include certain information to receive notifications about, certain times to receive notifications, certain geographic regions in which to receive notifications, and/or other preferences.

NOTAMs may also or alternatively be generated and displayed to the user automatically based on current and/or future submitted flight plan information. For example, a database of open notifications may be kept on or in connection with system 100 as notifications are generated (e.g., by agencies, by users, by airports, etc.). When a user's current or future flight plan parameters overlap parameters associated with a notice in the notification database, a NOTAM may be generated to notify the user of the relevant information. In another aspect, users may be allowed to search the notification database (e.g., using keyword searching, dropdown menus, chronologically, based on location, etc.) through flight planning system 110 or directly through a third-party source, to search or brows for particular notices or types of notices.

In another aspect, NOTAMs may be generated in conjunction with a flight safety calculator. For example, flight planning system may include or be connectable to (e.g., via a third-party device) a computational program configured to determine a safety rating based on certain flight plan information and other available information. In one aspect, the flight safety calculator may be configured to receive current and future weather information, ground condition information, user-provided information, and/or other information and generate a safety score based on such inputs. For example, weather information may include indicia of severity, location, altitude, and timing of unfavorable weather, which may be compared to flight plan information, such as flight path information, departure and arrival locations and timing, altitude, and/or other information. Based on the comparison, NOTAMs may be generated (e.g., official or unofficial), and communicated to client device 120 to alert the user of potential weather issues. The flight safety calculator may also receive inputs from third-party sources, such as FAA resources, the National Weather Service, other users, and/or other sources, which may be included as factors in the comparison and generation of NOTAMs.

In another aspect, third-party device 130 may be associated with a third-party that provides information to a user through client device 120. For example, third-party device 130 may be associated with an entity that provides an aviation tool (e.g., a mobile app) that may be accessed by client device 120. In some embodiments, flight planning tool 110 may communicate with third-party device 130 to integrate information and resources to enhance the aviation tool provided by the third-party.

In another aspect, third-party device 130 may include installed cockpit navigation equipment, wireless cockpit equipment, and/or other flight tools. Such third-party devices 130 may include wired or wireless communication interfaces configured to permit communication with client device and flight planning system via network 140. Information generated by such third-party devices may include flight routes, air traffic, weather information, and/or other information useful or planning flight maneuvers.

Network 140 may be any type of network (e.g., a communication network) configured to provide communications between components of system 100. For example, network 140 may be any type of network (including infrastructure) that provides communications, exchanges information, and/or facilitates the exchange of information, such as the Internet, a Local Area Network, Near Field Communication (NFC), WiFi, Bluetooth®, or other suitable connection(s) that enables the sending and receiving of information between the components of system 100. In other embodiments, one or more components of system 100 may communicate directly through a dedicated communication link(s) (not shown), such as a link between flight planning system 110 and client device 120.

Figure 2:
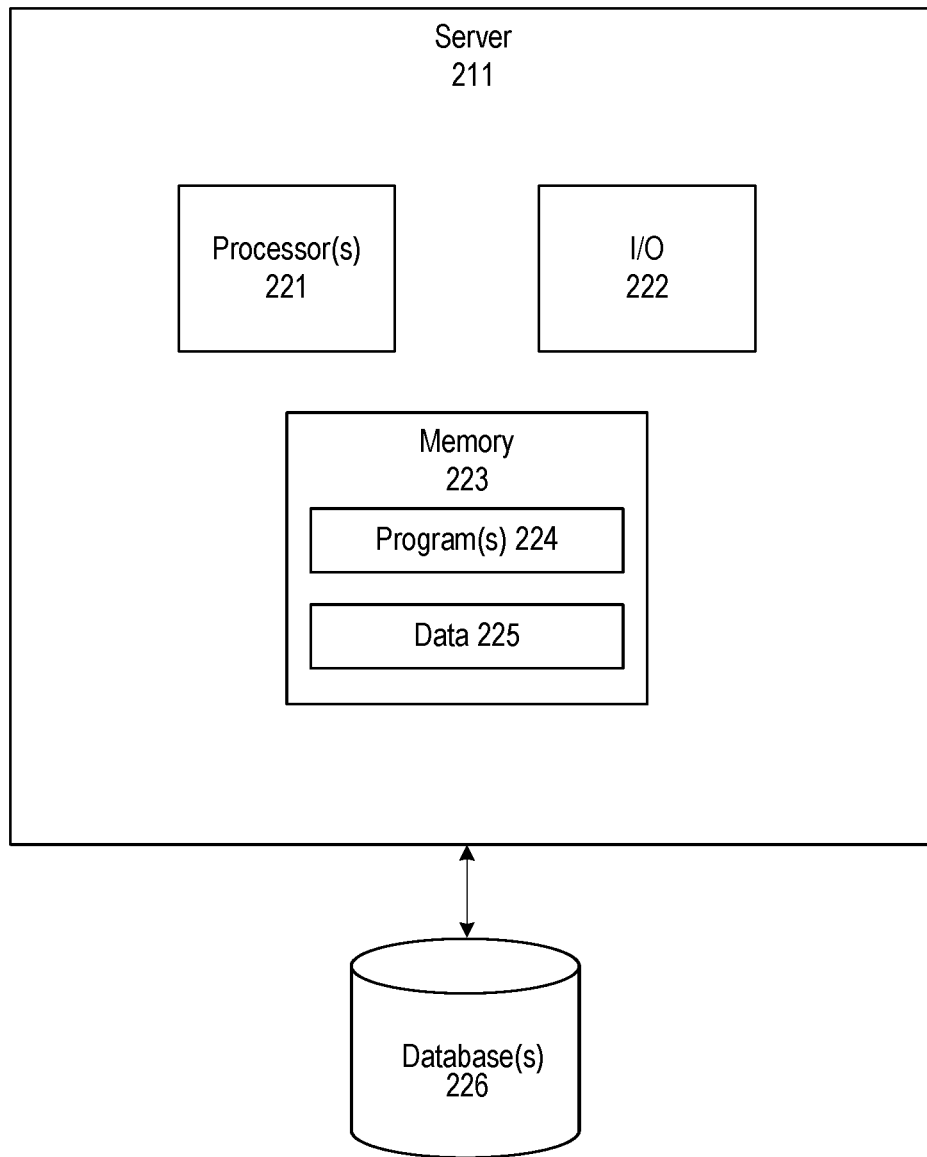
FIG. 2 is a block diagram of an exemplary server, consistent with disclosed embodiments.

FIG. 2 shows an exemplary server 211 for implementing embodiments consistent with the present disclosure. In an exemplary embodiment, server 211 may correspond to flight planning system 110. It should be understood, however, that variations of server 211 may correspond to client device 120, third-party device 130, and/or components thereof.

In one embodiment, server 211 may include one or more processors 221, one or more memories 223, and one or more input/output (I/O) devices 222. According to some embodiments, server 211 may be an embedded system or similar computing device(s) that generate, maintain, and provide web site(s) and/or mobile applications consistent with disclosed embodiments. Server 211 may be standalone, or it may be part of a subsystem, which may be part of a larger system. For example, server 211 may represent distributed servers that are remotely located and communicate over a network (e.g., network 140) or a dedicated network, such as a LAN.

Processor 221 may include one or more known processing devices, such as a microprocessor from the Pentium™ or Xeon™ family manufactured by Intel™, the Turion™ family manufactured by AMD™ or any of various processors manufactured by Sun Microsystems. The disclosed embodiments are not limited to any type of processor(s) configured in server 211.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the server 211, or program 224 could comprise multiple programs. Additionally, processor 221 may execute one or more programs located remotely from server 211. For example, flight planning system 110, client device 120, and/or third-party device 130, may, via server 211, access one or more remote programs that, when executed, perform functions related to certain disclosed embodiments. Memory 223 may also store data 225 that may reflect any type of information in any format that the system may use to perform operations consistent with the disclosed embodiments.

I/O devices 222 may be one or more devices configured to allow data to be received and/or transmitted by server 211. I/O devices 222 may include one or more digital and/or analog communication devices that allow server 211 to communicate with other machines and devices, such as other components of system 100.

Server 211 may also be communicatively connected to one or more database(s) 226. Server 211 may be communicatively connected to database(s) 226 through network 140. Database 226 may include one or more memory devices that store information and are accessed and/or managed through server 211. By way of example, database(s) 226 may include MS SQL, Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 200 may include database 226. Alternatively, database 226 may be located remotely from the system 200. Database 226 may include computing components (e.g., database management system, database server, etc.) configured to receive and process requests for data stored in memory devices of database(s) 226 and to provide data from database 226. In this way, database(s) 226 may be a centralized data store configured to enable real-time data sharing and synchronization with devices connected to system 100.

Figure 3:
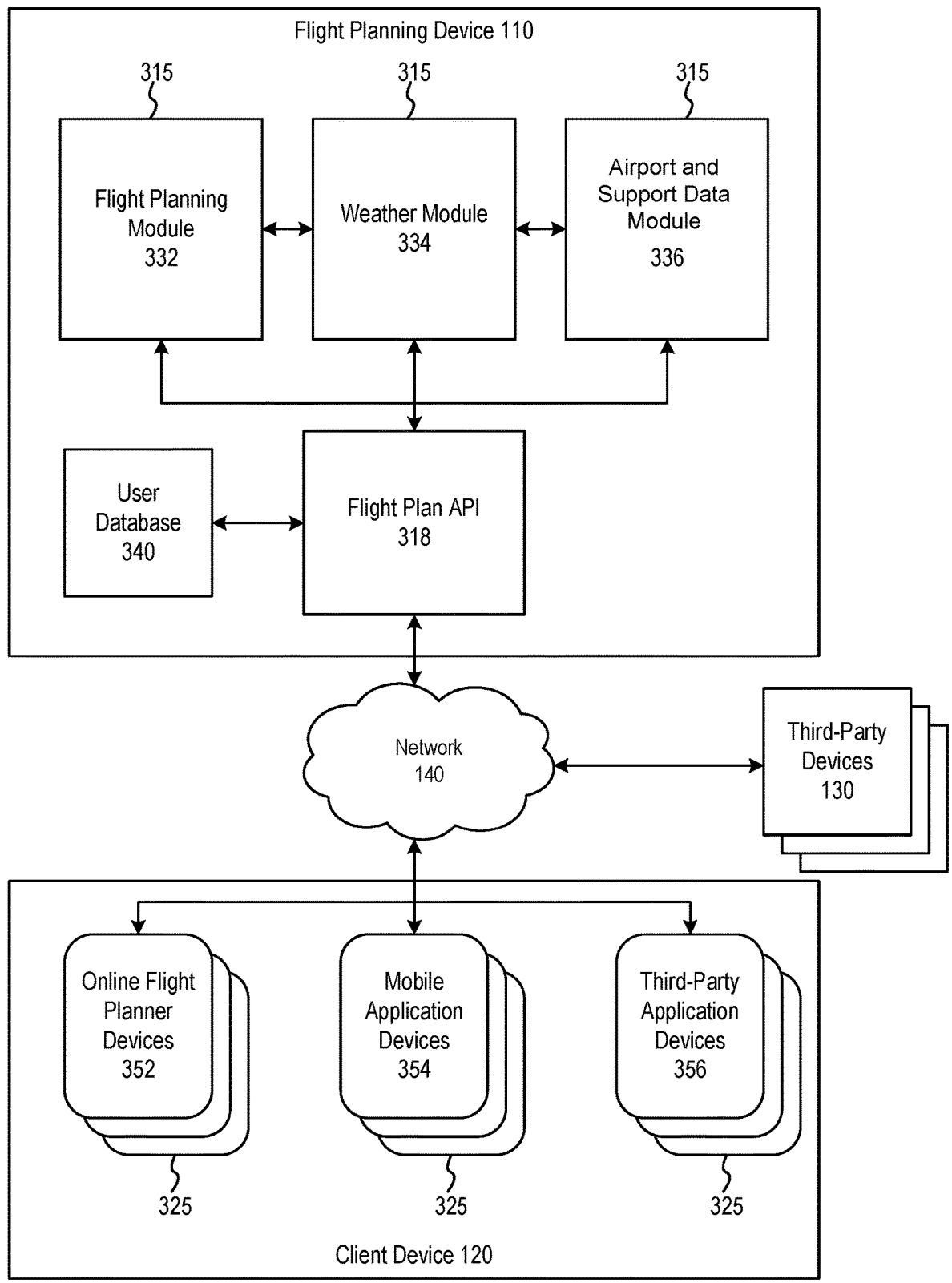
FIG. 3 is a block diagram of another exemplary system, consistent with disclosed embodiments.

FIG. 3 is a diagram illustrating an exemplary configuration of the components of system 100, including various additional components and features thereof. It should be understood that the configuration of system 100 depicted in FIG. 3 is exemplary, and that other configurations, including additional and/or alternative components and features are possible.

In an exemplary embodiment, flight planning system 110 may include features configured to generate a flight plan and/or provide the flight plan and/or aviation-related information to client device 120. For example, flight planning system 110 may include a plurality of modules 315 and a flight plan application programming interface 318 (API). Modules 315 may serve as data sources, configured to collect and store information, as well as to generate and store additional information and/or customized tools. Flight plan API 318 may be an exemplary interface through which flight planning system 110 may communicate with client device 120 and third-party device 130. That is, flight plan API 318 may be configured to allow flight planning system 110 to communicate with client device 120 and/or third-party device 130 over network 140. While flight plan API 318 is depicted and described as one interface, it should be understood that flight plan API 318 may include a plurality of interfaces, such as an internal flight plan API for communicating with client device 120 (e.g., through a website or mobile application associated with flight planning system 110) and an external flight plan API for communicating with client device 120 (e.g., through a third-party website or mobile application) and/or third-party device 130.

API 318 include a REST-based (representational state transfer) architecture or another type of architecture, if desired. API 318 may be configured to communicate various types of information, such as flight plant, pilot information, aircraft information, user-defined waypoints, user generated content, etc. API 318 may be device-agnostic. That is, API 318 may be configured to communicate successfully with devices having various operating platforms and/or communication protocols. API 318 may include encryption protocols, such as Secure Sockets Layer (SSL), to provide for secure data transmissions.

As shown in FIG. 3, client device 120 may include or embody one or more of a plurality of client devices 325. Client devices 325 may include devices operated by users. The users may operate client devices 325 to cause client devices 325 to communicate with flight planning system 110 via flight plan API 318 and/or third-party device 130 (e.g., through network 140). Client devices 325 may receive information from flight planning system 110 and/or third-party device 130 and display it with associated interface hardware. Further client devices 325 may be configured to receive user input, and provide the user input information to flight planning system 110 and/or third-party device 130, such as to cause those devices to provide certain information back to client devices 325.

Third-party device 130 may be connected to network 140 such that third-party device 130 may communicate with flight plan API 318 and/or client devices 325. As shown in FIG. 3, third-party device 130 may include a plurality of third-party devices 130, which each may be associated with a different third-party entity, as described above.

In an exemplary embodiment, modules 315 may include at least a flight planning module 332, a weather module 334, and an airport module 336. For the purposes of this disclosure, "modules" (also known as "engines") may be implemented in software, hardware, firmware, a mix of any of those, or the like. For example, if the disclosed "modules" are implemented in software, they may be stored in a memory associated with flight planning system 110. Processors, I/O devices, and memory devices may be utilized to perform processes to implement and facilitate operations of modules 315. Thus, modules 315 may include code instructions executable by one or more processors, alone or in various combinations with other modules disclosed in this or other embodiments. For example, flight planning module 332 may be configured to interact with weather module 334, and/or other modules of flight planning system 110, shown or not shown in FIG. 3, to perform functions consistent with disclosed embodiments. In other embodiments, if the disclosed "modules" are implemented in hardware, they may comprise an embedded system or other dedicated hardware configured by machine code, assembly code, or the like to interact with other modules of flight planning system 110 to perform functions consistent with disclosed embodiments.

Flight planning module 332 may be configured to generate flight trip data based on information received through other modules or from other devices (e.g., via API 318). Flight trip data may include any information or data pertaining a flight (e.g. a past flight, a present flight, a future flight) or aviation in general. Flight trip data may include, for example, flight plans, weather information, aircraft information (e.g., profile, maintenance, manifest, schedule, etc.), departure information (e.g., date, time, location, etc.), destination information (e.g., date, time, location, etc.), calendar information, travel information (e.g., hotels, rental cars, dining, attractions, etc.), and/or other information. For example, flight planning module 332 may be configured to execute software instructions to determine a route for a potential aviation flight. Flight planning module 332 may communicate with other modules 315 to collect information that may be used to calculate a flight route. Flight planning module 332 may also communicate with third-party devices 130 (e.g., via flight plan API 318) to collect information. Flight planning module 332 may provide a generated flight plan to client device 110 for display and use by a user.

In some embodiments flight planning module 332 may include various features configured to provide an interactive flight plan. For example, flight planning module 332 may include a flight planning engine, a routing engine, and a graphics engine. The routing engine may determine a route for the flight and the graphics engine may generate interactive charts and weather displays. The flight planning engine may combine the route and graphics to generate an interactive flight plan for a user.

Weather module 334 may be configured to track and store information related to weather that may affect aviation, such as by providing access to a collection of real-time, forecasted and predictive weather products via API 318 and/or client devices 120, 325. For example, weather module 334 may generate forecasts and predictions based on collected weather data or may receive completed forecasts and predictions. Weather module 334 may receive data and/or forecasts from third-party devices 130 (e.g., via flight plan API 318). For example, weather module 334 may access a weather forecast system such as Aircraft Owners and Pilots Association (AOPA) Weather. Weather module 334 may be configured to provide weather information to flight planning module 332 for use in generating a flight plan. Collected weather data and/or predictive weather information may be displayed on client devices 120, 325 in one or more of textual and graphical formats (e.g., via user interfaces configured to display text or a graphical image configured to convey a message).

Support data module 336 may be an additional module or modules configured to collect, generate, and/or store additional information that may be pertinent to aviation, such as information that may be used by flight planning module 332 to create a flight plan. For example, support data module 336 may provide information related to airports, aircrafts, airlines, pilots, social media, news, aviation entities (e.g., FAA, AOPA, etc.), and the like. Support module 336 may connect to third-party devices 130 associated with this information (e.g., via flight plan API 318) to gather and store information that may be used by flight planning module 332 and/or provided to client device 110 and/or a third-party device 130.

Exemplary features of support data module 336 may include flight planning resources such as an airport directory (e.g., through access to a full AOPA airports directory), weight and balance information, temporary flight restrictions, user-generated content, pilot and aircraft logbooks, manuals and instructions, calendars, etc. Further, while depicted and described with respect to support data module 336, it should be understood that other components of flight planning system 110 may additionally, alternatively, and/or work in combination with support data module 336 to provide these features.

The airport directory information may include, for example, airport procedures, airport diagram thumbnails and corresponding full-size diagrams (e.g., FAA airport diagrams), airport services, available fuel, communication frequencies, business information, and/or other information.

Information generated by an airport (e.g., by its staff) or a governing body (e.g., FAA) pertaining to the airport may also be available in the airport directory information. For example, information, including comments, messages, bulletins, and/or other remarks, from airport staff or the FAA, runway obstruction notices, or temporary procedural changes may be posted the directory in connection with a particular airport.

Directory information may be viewed in one or more different formats via a user interface. For example, director information may be vied in full-page views, thumbnails, printable formats (e.g., kneeboard formats, full page, etc.), screen overlays, etc. Overlays may be positioned over other screens and include information relevant to the underlying screen. For example, an overlay over screen showing a travel route may include information indicative of, for example, fuel available along the route, airports along the route, airport services along the route, etc.

Other information useful for planning or carrying out flight plans may also be available for browsing, searching, printing, and sharing (e.g., via email, social media, etc.). For example database information and/or third-party source information may include resources, such as communication frequencies, waypoint information, fuel statistics, date and time information (e.g., time zone information, date conventions, etc.), Morse Code information, ground communication frequencies, and/or other information. Such information may be available to view electronically, for printing (e.g., full view, kneeboard format, etc.), or for sharing.

Such information may also include advertising information displayed via user interfaces or overlays. For example, advertisement interfaces may be displayed (e.g., based on a user selection of a certain interface view, based on a determination that a flight has ended, etc.) that are configured to redirect users to websites, apps, or other interfaces to view additional information.

In another aspect, users may be allowed to monitor aircraft loading with respect to passenger and cargo loads. For example, signals indicative of weight and/or balance information generated by sensors (e.g., contact/pressure sensors, optical sensors, infrared sensors, barcode sensors, laser sensors, etc.) associated with passenger seats, cargo compartments, and/or other aircraft structural components may be received by flight planning system 110 from third-party devices 130 (e.g., via API 318) and translated into loading data. The loading data may include weight and/or balance values, qualitative indicia (e.g., colors, shapes, textures, etc.), and or other visual indicator that may be displayed via interface hardware. The loading data may be displayed on client devices 120, 325 in conjunction with a library known aircraft geometries and capacities. In this way, the user may be able to quickly identify opportunities to optimize weight distribution and/or balance and confirm that loading values are within ranges, for example, as provided by an aircraft pilot's operating handbook (POH).

Users may be allowed to print or fill out existing or downloadable checklist forms on user interfaces. In this way, users may be allowed to easily check off pre-flight, in-flight, and post-flight checklist items. Users may be allowed to access a library of common checklists for common aircrafts (e.g., stored in conjunction with third-party device 130, a user database, memory hardware, or other media storage) that may be viewed or downloaded via mobile application device 354. Users may also be allowed to modify existing checklists, create new checklists from available templates, or create new checklists from scratch in via one or more user interfaces in conjunction with interface hardware. For example, one of modules 315 may be configured (e.g., in conjunction with one or more processors), to generate a user interface configured to receive input indicative of checklist template modifications or a request to store a new template.

In addition to modules 315, flight planning system 110 may include or be connected to at least one database 340. Database 340 may contain relevant pilot, aircraft, and flight planning information that may be used by one or more components of system 100, such as flight planning module 332. Flight plan API 318 may be configured to retrieve information from database 340 for modules 315, client devices 325, and/or third-party devices 130. In an exemplary embodiment, database 340 may be an SQL database, but is not limited thereto.

Client devices 325 may include any client computing device configured to communicate with flight planning system 110 and/or a third party device 130. In an exemplary embodiment, client devices 325 may include online flight planner devices 352, mobile application devices 354, and third-party application devices 356. It should be understood that these representations of client devices 325 are made for convenience of discussion, and that they may overlap (i.e., a mobile application device 354 and a third-party application device 356 may be the same device).

Online flight planner devices 352 may be client devices 352 that are configured to communicate with flight planning system 110 to provide a web-based flight planning tool to a user. For example, online flight planner devices 352 may be laptop, desktop computer, notebook, tablet, smartphone, smartwatch, etc. configured to access a website (or other web-based application) provided by flight planning system 110. The website my provide access to a comprehensive flight planning tool provided by flight planning system 110.

Mobile application devices 354 may be client devices 352 that are configured to execute a mobile flight planning application. The mobile flight planning application may be a similar tool to the website accessible by online flight planner devices 352; however, it may be customized for use by a mobile device, including software that may be stored by mobile application devices 354. The mobile flight planning application may also provide access to a comprehensive flight planning tool provided by flight planning system 110.

Mobile application device 354 may include memory hardware, processing hardware, and interface hardware. Other features of mobile application device 354 may include a location device (e.g., a GPS device) configured to determine a location of mobile application device 354, and may also include a connection device configured to wirelessly connect to network 140 (e.g., a cellular communication device, Wi-Fi Device, Bluetooth® device, etc.). It is noted that other client devices 325, such as online flight planner devices 352 and third-party application devices 356, may include components described with reference to mobile application device 354, such as memory hardware, processing hardware, interface hardware, and any other hardware or software described with reference to mobile application device 354.

Mobile application device 354 may be configured to execute a mobile application stored in memory hardware. For example, mobile application device 354 may be a smartphone or tablet configured to run a mobile operating system (e.g., iOS, Android, etc.) which may be compatible with a variety of mobile applications provided by third-party providers. In an exemplary embodiment, the mobile application is a comprehensive flight planning tool. In other words, mobile application device 354 may be configured to provide a comprehensive flight planning tool to a user of mobile application device 354 via mobile application.

It is noted that mobile the application is not limited to use with mobile application device 354. The mobile application may be used with other client devices, such as online flight planner devices 352, third-party application devices 356, and/or other client devices 325. The mobile application may be appropriately configured for used with online flight planner devices 352, mobile application devices 354, third-party application devices 356, or any other client device 325. For example, the mobile application may be configured to be used in conjunction with web-based or web-browsing software, self-contained application software (i.e., an app), or third-party software accessible through web-based or self-contained software.

Mobile application device 354 may operate in conjunction with other devices in order to provide the comprehensive flight planning tool. For example, mobile application device 354 may communicate with flight planning system 110 and one or more third-party devices 130 via network 140. In one example, mobile application device 354 may communicate with flight planning system 110 to initially install mobile application 450.

Third-party application devices 356 may be client devices 325 that are similar to online-flight planner devices 352 and/or mobile application devices 354. For example, third-party application devices 356 may have web access and/or be configured to execute a mobile application. Regardless, third-party application device 356 may differ in that they connect to a third-party device 130 for receiving information through a website or mobile application. For example, third-party application devices 356 may include client devices 325 that store and execute one or more social media platforms provided by a third-party device 130. In an exemplary embodiment, flight planning system 110 may be configured to communicate with the associated third-party device 130 such that flight planning information may be combined with the third-party application to provide an integrated service to a user through a third-party application device 325.

Client devices 325 may include data storage hardware configured to store information locally on client devices 325. Client devices 325 may be configured to store any type of information that may be used on connection with system 100, such as pilot information, aircraft information, user preferences, waypoint information, flight information, airport directory information, and or other information. Stored information may include information received from third-party devices 130, information generated by flight planning system 110, and information received from the user. In this way, client devices 325 may be configured to provide online and offline access to information relevant to carrying out flight plans and/or performing other tasks. Such information may also or alternatively be stored on other data storage devices associated with system 100 that are accessible via client devices 325 when access to all or portions of network 140 is unavailable.

The exemplary disclosed embodiments allow for the accumulation of all information that may be useful in aviation, such as flight planning or flying. The configuration and components (e.g., flight plan API 318) of the disclosed embodiments allow this information to be routed to various components where it may be used to generate additional information, graphics, data sets, etc., which may in turn be provided to and used by a user, either directly through a website or mobile application or indirectly through integration with a third-party service. Exemplary processes that the components of system 100 may perform to provide these and other features are described below.

Figure 4:
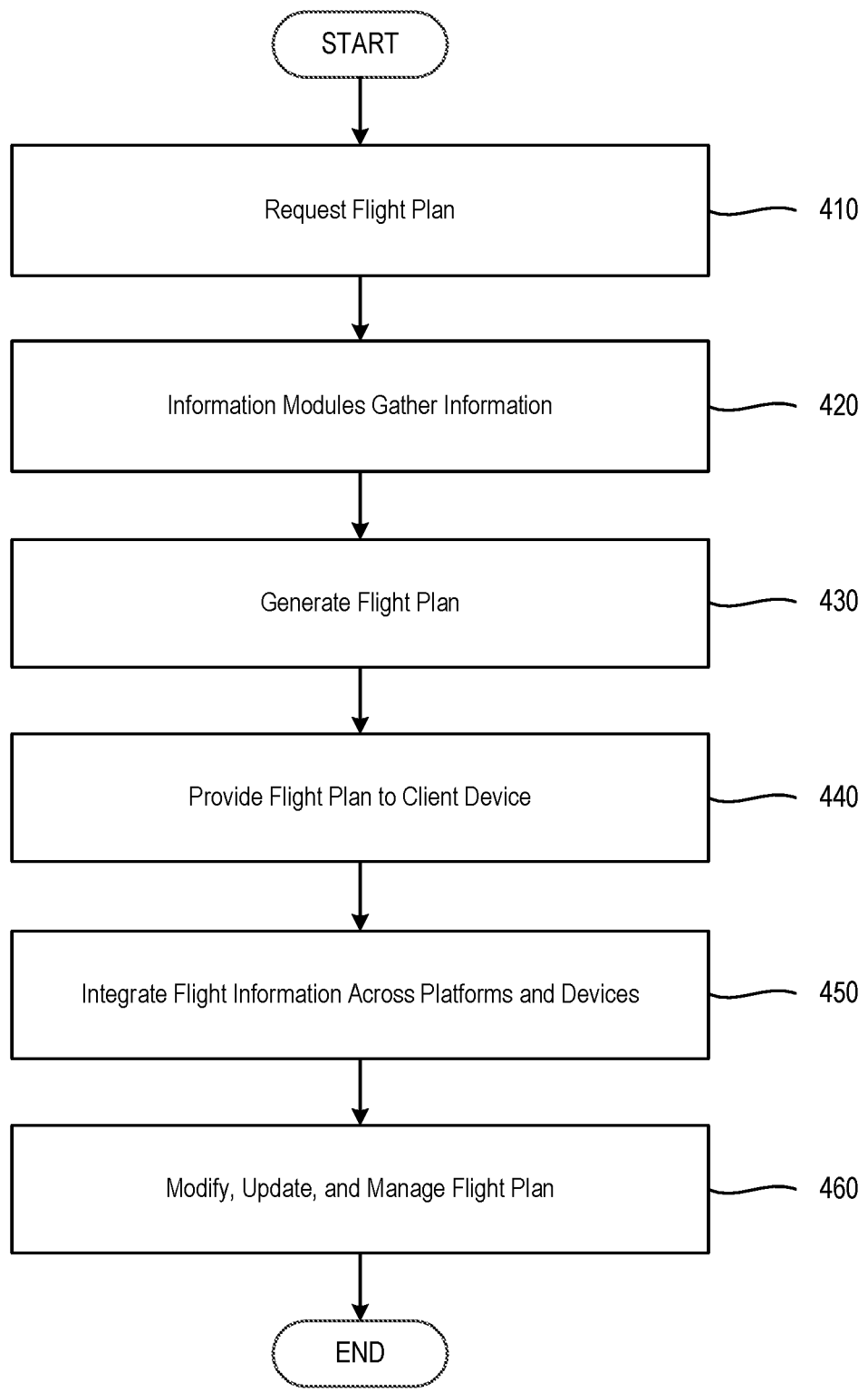
FIG. 4 is a flowchart of an exemplary flight information distribution process, consistent with disclosed embodiments.

FIG. 4 is a flowchart of an exemplary flight information distribution process 400. In one embodiment, one or more of the components of system 100 may perform process 400 to provide flight information to user of client device 120. The flight information may include any information related to aviation that may be useful to the user, and may be more than information alone. For example, the flight information may include an interactive flight plan including information and generated graphics configured to be displayed through an interface.

Flight planning system 110 may receive a request for flight information (step 410). Client device 120 may generate the request based on input from a user using interface hardware. Client device 120 may transmit the request to flight planning system 110, such as through flight plan API 318. For example, a user may operate client device 120 to interact with a website or mobile application provided by flight planner device 110, which may include a request for flight information, such as a flight plan for an upcoming flight. The request may include information for creating the flight plan, such as information identifying a pilot, aircraft, origin, destination, schedule, etc. Flight planning system 110 may route the request to the appropriate component(s), such as modules 315.

Modules 315 may store a received request and gather other information that may be used to respond to the request (step 420). For example, flight planning module 332 may receive a request for flight information that includes a flight plan. Modules 315 may execute software instructions to perform one or more processes to gather the information necessary to generate the flight plan. For example, flight plan module 332 may communicate with weather module 334 to receive weather forecast information for the time period around the planned flight. Flight plan module 332 may communicate with one or more support data modules 336 to gather any temporary flight restriction alerts that may affect the flight. Flight plan module 332 may also communicate with database 340 to collect airport information (e.g., maps, locations, etc.), historical weather information, pilot information, etc.

Flight planning system 110 may create a request response (step 430). The request response may be the flight information requested in step 410, for example, in a form that may be sent to client device 120. In the example of client device 120 requesting a flight plan, flight planning module 332 may generate the interactive flight plan based on the information gathered in step 420. Flight planning system 110 may subsequently send the request response to client device 120 (step 440). For example, flight planning system 110 may send a generated flight plan to client device 120 via flight plan API 318. In other embodiments, flight planning device may supply requested data to client device 120, and client device 120 may use the requested data to generate an interactive flight plan.

In some embodiments, flight planning system 110 may integrate flight information across platforms and devices (step 450). For example, flight planning system 110 may sync, in real-time, a generated flight plan, in-flight information (e.g., speed, altitude, etc.), and the like across multiple devices and components (e.g., online flight planner device, mobile application devices, third-party devices, etc.). In another example, flight information may be integrated into third-party services, such as social media, logbooks, calendars, etc. For example, flight planning system 110 may communicate with a client device 120 or third-party device 130 to update a pilot's calendar to include an upcoming flight, and set reminders for the flight. Similarly, flight planning system 110 and/or client device 120 may communicate with various other hardware, such as in-cockpit devices (e.g., instruments, wireless devices, computers, communication equipment, radar, etc.) associated with an aircraft, electronic engine monitoring systems, and panel mounted navigation controls and devices, to upload or download flight trip data or the like. Flight planning system 110 may also communicate with a client device 120 or third-party device 130 to update a pilot's logbook to include up to date logbook information. Logbook information may include, for example, aircraft information, pilot information, flight information, departure information, destination information, time, waypoints visited, fuel on board, passengers on board, and/or any other information that is or is not required to be logged.

In one aspect, third-party device 130 may be a schedule organizer and may receive flight plan and other information to update a calendar. The calendar may be stored on the third-party device, on client device 120, 325, in memory 223, in database(s) 226, in user database 340, or in any other data storage device associated with system 100. The calendar may also be linked with a user profile accessible through client device 120, 325. The calendar may include entries containing information regarding events associated with, for example, airports (e.g., scheduled closures, social events, fuel deliveries, etc.), aircrafts (e.g., scheduled maintenance, recurring flights, etc.), and/or associated personnel. In one aspect, the calendar may include information that may be used to plan a full trip, such as hotel reservations, local attractions, entertainment, points of interest, and/or other information. Such information may be displayed on a calendar in a user interface, and the information may be displayed in coordination with received flight plant information (e.g., current location, destination location, current/future date and time, etc.) and/or other entries on the calendar. Other content from other third-party sources may be included, as desired.

Calendar entries may be used to generate reminders. For example, a reminder may be created on client device 120, 325 (e.g., visual reminders, graphical images, user interfaces, etc.) regarding a scheduled event prior to the event occurring. The reminder may be configured as a push notification or other type of visible reminder on client device 120. As used herein, push notifications may include graphical display overlays containing notification information that are automatically generated by one or more processors, computing device, or client devices. In this way, pertinent information may be brought to the user's attention as the events become relevant based on time, location, and/or other ascertainable variables.

In another aspect, third-party device 130 may be configured to provide trip planning information to system 100. Trip planning information may include, for example, hotel accommodations, commercial airfare, rental car information, restaurant information, attractions, points of interest, events, etc. Flight planning system 110 (e.g., in conjunction with one or more processors and/or other computing devices) may collect trip planning information, via the API, from third-party device and display the trip planning info on client device 120, 325. Flight planning system may collect trip planning information in connection with flight planning information provided by the user or by an automatically generated flight plan. For example, flight planning information, such as departure location, destination location, dates and times, future flight plans, and/or other information may be used by flight planning system 110 to collect relevant trip planning information.

In another aspect, third-party device 130 may be a social media platform configured to receive information from flight planning system 110 and/or client device 120, such as flight plans, pictures, schedules, locations, events, etc. Certain information may be automatically or conditionally submit the second request to the flight planning entity via the flight planning system based on the user inputs. (e.g., based on a user permission or preference, based on a category of information, etc.) sent to one or more social media platforms, such as calendar events, notices of flight arrivals and/or departures (e.g., including time, date, location, etc.), flight plan details, and/or other information.

Further, in some embodiments, such as those in which a flight plan is generated, one or more of the components of system 100 may display, modify, update, manage, and/or configure the flight plan (step 460). For example, client device 120 may display the flight plan, which may allow a user to view and interact with the flight plan. For example, the user may view a generated flight route, airport information (in various formats such as full page, overlays, kneeboard, etc.), weather information, etc. The user may select which information to view in an interactive manner, which may include various charts, maps, and other graphics that further enhance the flight planning experience.

In some embodiments, flight planning system 110 may continuously update information provided to client device 120, such as by modifying the flight plan and/or providing additional features. For example, flight planning system 110 may provide notifications (e.g., push notifications in a mobile device) regarding temporary flight restrictions, changes in weather, news, airport changes, etc. Similarly, flight planning system 110 may integrate newly received information into a flight plan or flight profile. For example, flight planning system 110 may communicate with client device 120 or third-party device 130 to collect in-flight information, such as to maintain real-time information related to an ongoing flight.

Further, in some embodiments, flight planning system 110 may provide flight information to a third-party device 130. For example, flight planning system 110 may coordinate flight plan filing through an FAA authorized filing agency (e.g., via flight plan API 318). Similarly, flight planning system 110 may provide information (e.g., via flight plan API 318) to integrate with third-party services, such as social media, other flight planning services, weather services, etc., such as through communication with third-party devices 130 (or client device 120 connected to a third-party device 130).

Consistent with disclosed embodiments, client device 120 may provide an interactive flight plan or other flight information to a user. The interactive flight plan and available flight information may be generated by flight planning system 110, which may have access to all information that may be pertinent to a flight through, for example, a network connection to internal and third-party systems via an API. In this way, pilots and other aviation personnel may request and receive customized flight information and interactive flight plans that serve as convenient and comprehensive flight tools for use in preparing for and executing a flight, especially a general aviation flight. Further, the connection with different types of client devices and various third-party devices allows for various formats (e.g., websites, mobile applications, etc.) and thorough integration of flight information with other services. Further, the disclosed flight planning device may serve as an information warehouse for storing information related to pilots, crew, aircrafts, airports, custom waypoints, flight trip data, user-submitted information, etc.

While some features of flight plans produced by system 100 have been described with respect to the above embodiments, it should be understood that they are not limited thereto, and that various other features may be included or featured, depending on the information requested. For example, user-submitted content and information, such as photographs, messages, news articles, etc., may be received by system 100 in conjunction with capabilities of client devices 120, 325 and shared between users through flight plans and other services. In one aspect, system 100 may be configured to display the user-submitted information on at least one other device (e.g., another client device 120, 325, a third-party device 130, etc.). Pertinent information, such as fuel prices, flight tracking information, weight and balance information, etc., may also be made readily available from user-submitted information.

For example, a fueling tool may provide sortable fuel information relating to available fuel in certain areas (e.g., at a plurality of airports, airport-affiliated suppliers, third-party suppliers, etc.) and include information posted by other users relating to fuel prices at certain location. The fueling tool may include or provide access to information on various types of fuel available at particular locations, such as 100-LL (avgas), Jet A, MoGas (automotive grade), and others. Fuel information may be stored in a fuel database or other database stored on one or more of client devices 120, 325 and server 211. The fuel tool may also include search functionality to allow users to quickly find the location of desired fuel. For example, the fuel tool may be a user interface configured to receive a request for fuel information. The user interface may include user forms, such as dropdown menus, radio buttons, and text bars, which allow the user to search and/or sort through (e.g., through filters) information by fuel type, price (e.g., maximum, minimum, range, etc.), distance (e.g., from a current location, along a route, from a destination, etc.), vendor type (e.g., public, private, etc.), or other information.

Various formats, such as kneeboard formats, may be created and used by client device 120 to increase convenience for the pilot. For example, directory information and/or other information may be vied in full-page views, thumbnails, printable formats (e.g., kneeboard formats, full page, etc.), screen overlays, etc. Kneeboard formats may be configured to generate information on documents sized to fit known or custom kneeboard devices. Overlays may be positioned over other screens and include information relevant to the underlying screen. For example, an overlay over screen showing a travel route may include information indicative of, for example, fuel available along the route, airports along the route, airport services along the route, etc.

Tracking and aggregation of various flight-related information, data, events, and activities may also be available. For example, flight planning system 110 may be configured to display on client device 120 a graphical tool, such as a graphical user interface or graphical overlay, configured to aggregate and show critical, pertinent, and/or relevant information relating to a flight. This graphical tool may be a widget, dashboard, or other type of graphical tool that allows a user to view and or interact with pertinent data and/or command functionality. This graphical tool may aggregate the most pertinent flight information from one or more sources of information (e.g., third-party devices 130, any component of flight planning system 110, client device 120, etc.) according to a default setting, a customized user setting, or programmed logic that periodically or conditionally changes the types of information displayed on the graphical tool. This graphical tool may include flight trip data, aircraft data, pilot data, calendar data, and or other information. This graphical tool may display messages, notes, alerts, warnings, and/or push notifications to the user. Such information may include messages from airports and authoritative bodies, messages from other aircraft, weather updates/warnings, breaking news, social media feeds, advertisements, and/or other information. This graphical tool may be customizable to allow users to select the types of information that appear on the graphical tool. All relevant information displayed by this graphical tool may include all information relevant to a flight and available via network 140. Alternatively, all relevant information may include information selected for display according to a default configuration, a customized or personalized configuration, or based on control logic configured to prioritize information, override default and customized/personalized settings, and/or generate push notifications.

Tracking and aggregation of other flight-related information may also be available. For example, flight planning system 110 may save a navigation log, which may include detailed information such as altitude, frequencies, heading, winds, waypoints, intermediate and destination airports, etc. Such information may be accessible for viewing in electronic format or printable format (e.g., full view, kneeboard layouts, etc.) and may be exportable via a wired communication interface, Wi-Fi, the Internet, a cellular network, etc.

The exemplary disclosed embodiments describe a comprehensive flight planning tool. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs created on the basis of the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for providing a flight planning tool, comprising:
   at least one memory device for storing flight information;
   a plurality of modules configured to collect, store, or generate information, wherein the plurality of modules includes a weather module configured to receive weather data from a third-party device, the weather data including information usable by a flight planning module to generate a flight plan; and
   at least one hardware processor configured to execute instructions to:
      provide an Application Program Interface (API) for facilitating communication between the system and at least one of a client device and one or more third-party devices;
      receive, via the API, a request from the client device, the request from the client device including a user input received via a computing system and indicative of first information related to a flight;
      collect, via the API, second information from one or more third-party devices based on the first information received from the client device via the API;
      generate a weather message based on the user input indicative of the first information and the second information collected from the one or more third-party devices, wherein the weather message includes information associated with the flight;
      provide, via the API, at least one user interface to the client device for communicating the weather message; and
      display, via the at least one user interface provided to the client device, graphics indicative of the information associated with the flight included in the generated weather message.

2. The system of claim 1, wherein the weather message is associated with an aspect of the generated flight plan.

3. The system of claim 2, wherein the associated aspect of the generated flight plan is a flight path, an airport, or a geographic region.

4. The system of claim 1, wherein the weather module is configured to supply weather information to a flight safety calculator that is configured to generate a safety score based on the weather information.

5. The system of claim 4, wherein the flight safety calculator generates the safety score based on one or more of current weather information, future weather information, ground condition information, and user-provided information.

6. The system of claim 4, wherein the flight safety calculator generates the safety score based on weather information that includes one or more of indicia of weather severity, location, altitude, and timing of unfavorable weather.

7. The system of claim 4, wherein the flight safety calculator is configured to compare the weather information to flight plan information that includes one or more of, a flight path, departure and arrival locations, departure and arrival timing, and altitude.

8. The system of claim 1, wherein the plurality of modules includes a flight planning module configured to generate flight trip data based on information received from the weather module.

9. The system of claim 8, wherein the flight trip data includes a flight route.

10. The system of claim 9, wherein the flight planning module is configured to generate an interactive chart that includes the flight route and graphical weather information.

11. The system of claim 8, wherein the flight planning module is configured to update an existing flight plan based on information from the weather module.

12. The system of claim 1 wherein the client device is configured to provide offline access to information from the weather module.

13. A method for providing a flight planning tool, comprising:
   providing at least one memory device for storing flight information;
   providing a plurality of modules configured to collect, store, or generate information, wherein the plurality of modules includes a weather module configured to receive weather data from a third-party device, the weather data including information usable by a flight planning module to generate a flight plan; and
   executing instructions via at least one hardware processor to:
      provide an Application Program Interface (API) for facilitating communication between the system and at least one of a client device and one or more third-party devices;
      receive, via the API, a request from the client device, the request from the client device including a user input received via a computing system and indicative of first information related to a flight;
      collect, via the API, second information from one or more third-party devices based on the first information received from the client device via the API;
      generate a weather message based on the user input indicative of the first information and the second information collected from the one or more third-party devices, wherein the weather message includes information associated with the flight;
      provide, via the API, at least one user interface to the client device for communicating the weather message; and
      display, via the at least one user interface provided to the client device, graphics indicative of the information associated with the flight included in the generated weather message.

14. The method of claim 13, wherein the weather message is associated with an aspect of the generated flight plan.

15. The method of claim 14, wherein the associated aspect of the generated flight plan is a flight path, an airport, or a geographic region.

16. The method of claim 13, further including supplying weather information via the weather module to a flight safety calculator that is configured to generate a safety score based on the weather information.

17. The method of claim 16, further including generating the safety score via flight safety calculator based on one or more of current weather information, future weather information, ground condition information, and user-provided information.

18. The method of claim 16, further including generating via flight safety calculator the safety score based on weather information that includes one or more of indicia of weather severity, location, altitude, and timing of unfavorable weather.

19. The method of claim 16, wherein generating the safety score includes comparing the weather information to flight plan information that includes one or more of, a flight path, departure and arrival locations, departure and arrival timing, and altitude.

20. The method of claim 13, wherein the plurality of modules includes a flight planning module configured to generate flight trip data based on information received from the weather module, wherein the flight trip data includes a flight route, the method further including:
  generating via the flight planning module an interactive chart that includes the flight route and graphical weather information; and
  updating via the flight planning module an existing flight plan based on information from the weather module.

* * * * *